Dec. 31, 1957
R. W. OKIE
2,818,010
COFFEE MAKER
Filed July 5, 1950
2 Sheets-Sheet 2
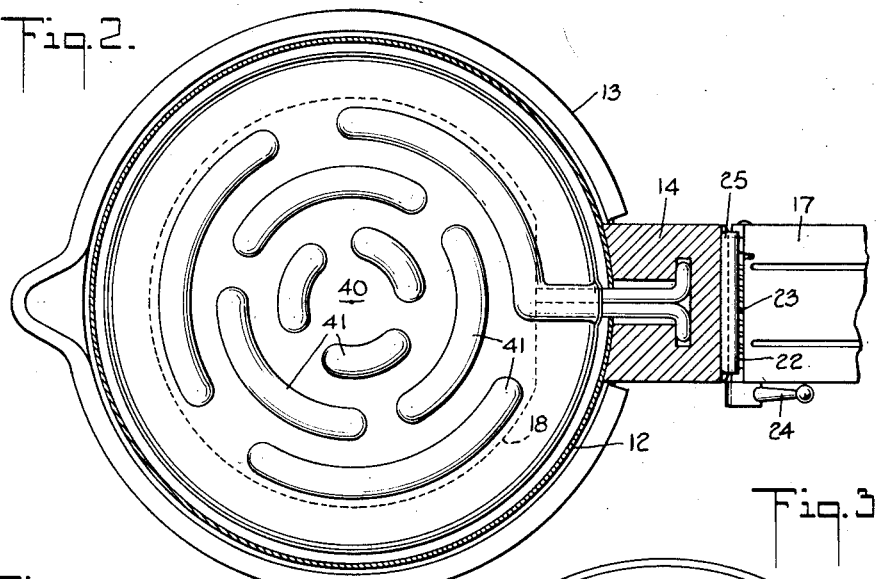
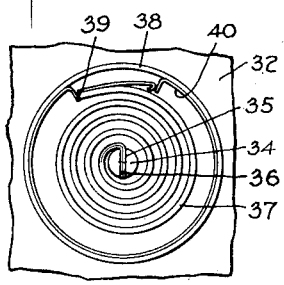
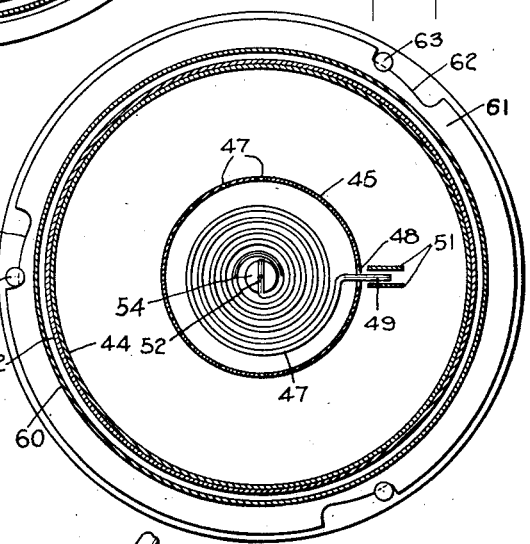
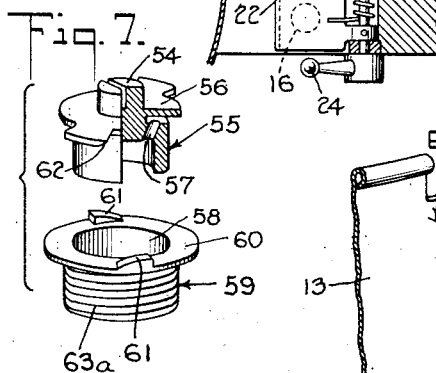
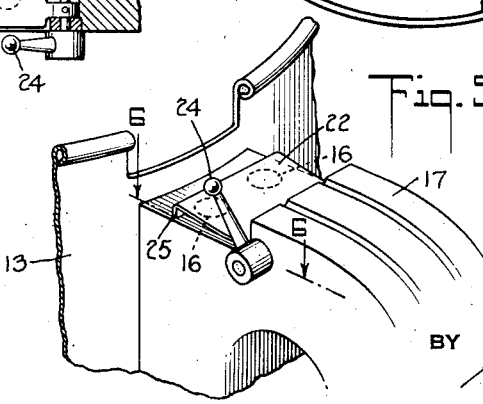
INVENTOR
R. W. OKIE
BY
ATTORNEY ial No. 172,103

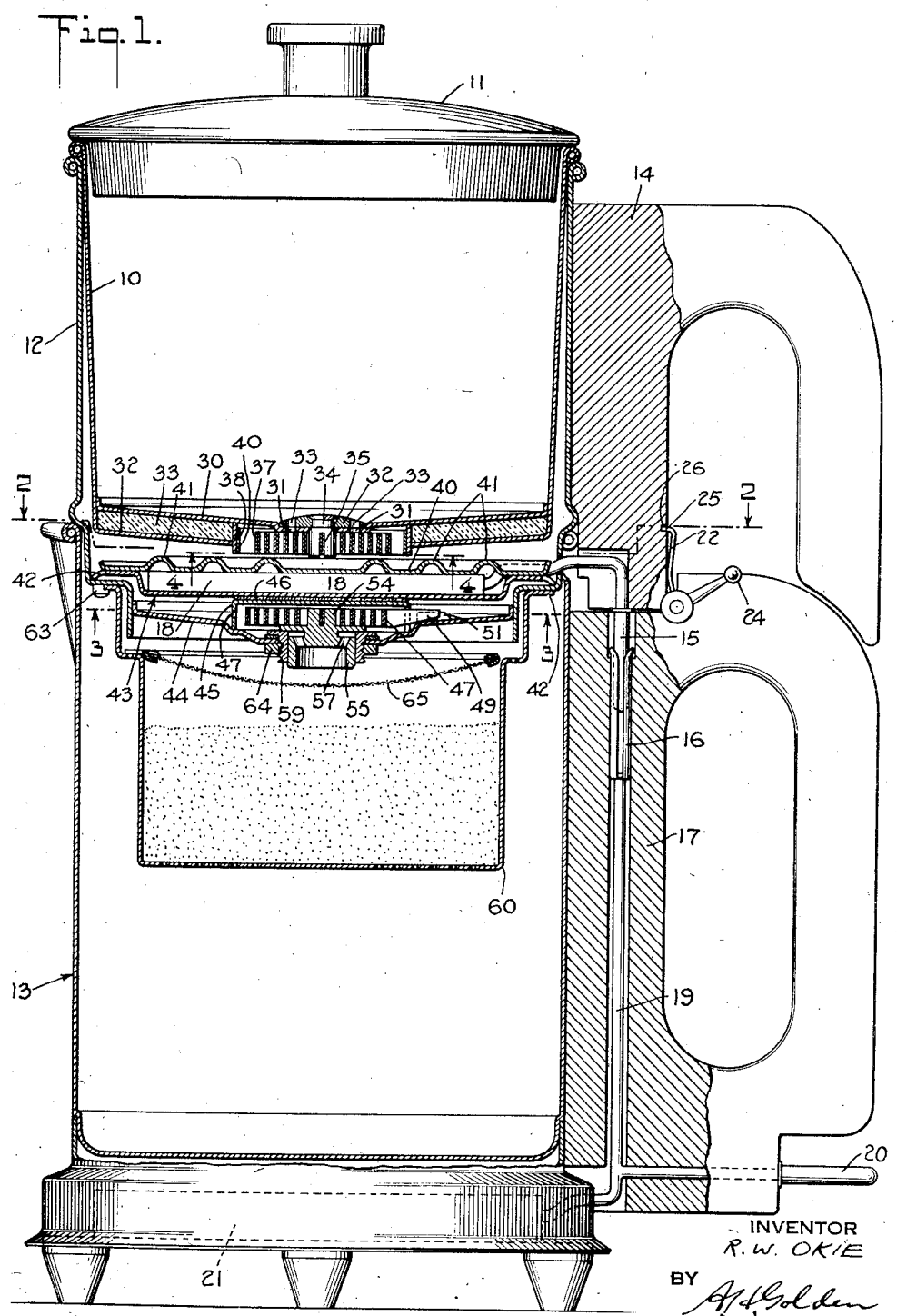

United States Patent Office 2,818,010
Patented Dec. 31, 1957

2,818,010

COFFEE MAKER

Reginald W. Okie, Greenwich, Conn.

Application July 5, 1950, Serial No. 172,103

9 Claims. (Cl. 99—283)

This invention relates to a coffee maker, and more particularly to a coffee maker of the drip type that is completely automatic in operation. In coffee makers of the particular class, it is customary to heat electrically a quantity of water and then allow the water to flow over ground coffee, the essence of the coffee then being taken by the water downwardly into a compartment from which the coffee is dispensed. In the prior art, coffee makers of this type have been provided for heating water and automatically allowing it to flow downwardly over ground coffee into a lower dispensing container, but the control of the water temperature was not properly maintained so that excellent coffee did not result.

As a feature of my invention, I arrange to heat the water to be used in the making of the coffee in small increments. By this arrangement, the water is heated rapidly and the coffee making operation starts almost immediately upon the activation of the heating elements of my coffee maker. As a still further feature of my invention, the heated water is not allowed to flow over the ground coffee until after it has reached a particular temperature just as it is about to contact the ground coffee.

As a further feature of this part of the invention, the temperature of the water moving to the ground coffee is controlled practically at the point of admission to the ground coffee by a thermostat actuated by the water temperature. In other words, I arrange to heat my water at an extremely high speed, and then allow it to flow outwardly toward the ground coffee upon reaching a required temperature, with the required temperature being controlled at the point practically where the ground coffee is to be contacted.

The theory of my coffee maker will be better appreciated if it is understood that the water initially put into the coffee maker is maintained at that temperature which it has reached when it is placed into the coffee maker. Upon the water heating element reaching a predetermined temperature, water is admitted in a very small increment to the heating element and is heated at a very high speed. The small increment of water fed to the heating element itself acts to shut off the further flow of water to the heating element for a short interval until the heating element reacts to admit a further increment of water to repeat the cycle. Thereafter, this water is acted upon by the heating element and allowed to flow downwardly and toward the ground coffee upon reaching a required temperature, the water temperature itself determining whether or not the water is ready to flow toward the ground coffee, and at a point just in advance of its contact with the ground coffee.

As a further feature of my invention, I utilize a particular assembly of mechanical parts operating under the theory of operation I have hereinabove set forth, and this mechanical assembly is itself extremely novel and important, it being appreciated, however, that my invention will operate with mechanical assemblies other than that herein to be set forth and described particularly.

As one feature of my mechanical assembly, I utilize a lower dispensing container and an upper coffee making container, the coffee making container including all of the necessary and required elements for the making of the coffee. Thus, the upper coffee making container will have a water supply, a heating element, and the necessary thermostats together with a ground coffee container. The purpose of the arrangement is to permit the separation of the entire coffee making assembly from the coffee dispenser so that upon conclusion of the coffee making cycle, the dispenser may be made available for ready usage.

More particularly, it is a feature of my invention to utilize a lower container or coffee dispenser equipped with a handle and a heating element for maintaining warm the coffee that has been made and placed in the container. Suitable sockets are carried by the coffee dispenser and are adapted for coaction with prongs carried by the coffee making assembly, so that the union of the coffee making assembly to the dispenser places the heating element of the coffee making assembly in the circuit of the heating element of the coffee dispenser. In this way, the coffee making assembly is actuated upon the mechanical union of the parts of my coffee maker. It is a particular feature of the invention that the sockets of the coffee dispenser are maintained closed by a cover member when the coffee making assembly is removed, this cover member also acting as an assembly detent.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a vertical section of the coffee maker of my invention showing the upper coffee making assembly united to the lower coffee dispenser unit of the coffee maker. Figs. 2, 3 and 4 are, respectively, sections taken along lines 2—2, 3—3, 4—4 of Fig. 1. Fig. 5 is a perspective view of the cover and detent mechanism used to cover the electrical sockets and to maintain the coffee maker assembled. Fig. 6 is a view taken along lines 6—6 in Fig. 5. Fig. 7 is an exploded view of one form of valve that may be used in my invention.

Referring now more particularly to the drawings, reference numeral 10 indicates an upper water container adapted to be covered by a cover 11 and to be nested within an open chamber formed by a sheet metal outer housing 12. This housing 12 is adapted to hold or contain therein all of the active parts of what I term the coffee making assembly. Moreover, the outer housing 12 is adapted as a unit to be assembled to the coffee dispenser designated generally by reference numeral 13.

For handling the sheet metal outer housing 12, and therefore the entire coffee making assembly, there is secured thereto a handle 14 made from some suitable plastic material. The handle carries a pair of current conducting prongs 15, it being the function of the prongs 15 to fit into current conducting sockets 16 carried by a handle member 17 fixed to the coffee dispenser 13. When the prongs 15 are inserted in the sockets 16, it is obvious that current will then flow from the sockets 16 into the prongs 15 and toward a heating element 18 made a part of the coffee making assembly. The sockets 16 are through wires 19 in contact with a pair of contact members 20 through which current is fed to the entire coffee maker. The wires 19 are also in electrical contact with a heating element 21 of the coffee dispenser, this heating element being utilized to maintain at a particular temperature the brewed coffee that is fed to the coffee dispenser from the coffee making assembly.

At all times when the coffee making assembly, carried by the housing 12 and the handle 14, is separated from the coffee container 13 and its handle 17, the sockets 16 are maintained covered by a combination cover and detent member 22, best illustrated in Figs. 1, 3, 5 and 6. The combination cover and detent member 22 is urged to covering position by a spring 23 and may be moved out of covering position by a finger piece 24. Thus, in Fig. 5, it will be seen that the cover 22 is in covering relation to the sockets 16. Upon actuation of the finger piece 24, the cover 22 may be moved to a position just clockwise of its position in Fig. 1. Thereafter, upon the placing of the coffee making assembly into its assembled relation to the coffee dispenser 13, the prongs 15 will enter the sockets 16, and a detent flange 25 of the cover member 22 will enter a slot 26 in the handle 14. Thereafter, the handle 14 will be held against separation from the handle 17, and the coffee maker will be maintained fully assembled. To remove the sheet metal housing 12 of the coffee making assembly from the coffee dispenser, the finger piece 24 must now be rotated clockwise in Fig. 1 to move the detent flange 25 out of the slot 26. It is then possible to move the handle 14 and the housing 12 upwardly and to move the prongs 15 from the electric sockets 16. The dispenser 13 is then ready for use as a dispenser or pourer.

The upper water container 10 is equipped with an intermediate bottom plate 30 formed with a series of valve openings 31 in a depressed central portion thereof. The container itself has a lower bottom plate 32, and between the intermediate bottom plate 30 and this lower bottom plate 32 there is placed insulation 33, it being the function of this insulation 33 to prevent the heating by element 18 of the water in the upper water container 10.

Rotatably mounted relatively to the depressed central portion of the intermediate bottom plate 30 and the valve openings 31, is a valve plate 32 equipped with bores 33. A stud 34 is secured to the valve plate 32, the stud 34 having a slot 35, as best illustrated in Fig. 4, for the entry of the inner end 36 of a coiled thermostat element 37. Element 37 is housed within a ring 38 fixed between the intermediate bottom plate 30 and the lower bottom plate 32 of the upper water container 10, and its outer end 39 is secured against movement relatively to the ring 38 by a holding device 40 as is well illustrated in Fig. 4.

Those skilled in the art will, of course, fully appreciate that when heat is applied to the thermostat element 37, it will tend to rotate the stud 34 and the valve plate 32. This rotation will rotate the valve plate 32 to bring its bores 33 in alignment with the bores 31. When this is brought about, water will flow from the water supply container 10 downwardly through the aligned bores 33, 31 and over the thermostat element 37 toward the heating element 18 earlier described. In actual operation, the heating element 18, when energized, will have the heat thereof applied against the thermostat element 37, but no heat will be applied to the water contained in the upper water container 10, so that that water will relatively cool. Once the thermostat element 37 is exposed to the heat from the heating element 18, it opens the passages 33, 31 upon reaching a predetermined temperature, and water is allowed to flow toward the heating element 18. This water, being comparatively cool, reacts on the thermostat 37 to cool it momentarily so that the thermostat tends to disalign the passages 33, 31 to prevent the flow of additional water from the upper water container 10. This is merely momentary because the heating element 18 operates at considerable speed and raises the temperature of the water exposed thereto, and then once more causes thermostat 37 to admit additional water to the heating chamber and element 18.

Referring now more particularly to Fig. 2, it will be noted that the heating element 18 lies immediately below a metal member 40 having a series of raised surfaces 41 of various shapes adapted to define a series of water flow troughs through which water can flow to the outer rim of the metal member 40. The water will flow by gravity to the outer rim of member 40 and then downwardly through a series of relatively large openings 42 in a metal plate 43 forming the bottom supporting plate for the heating element 18. The water thus flowing downwardly will move onto a plate 44 welded or otherwise assembled to the sheet metal housing 12 to form an integral part thereof. Plate 44 has fixed thereto an inverted cup-like member 45, the upper surface of which is insulated. Carried within the cup 45 is a coiled thermostat element 47 similar to thermostat element 37.

The purpose of the cup-like member 45 and the insulation surface 46 thereof is to house the thermostat 47 and to maintain it against being affected by the heat of the heating element 18. As best seen in Fig. 3, a series of openings 47 are formed in the cup-like member 45 for the admission of water therein, this water flowing downwardly on the plate 44 from the upper plate 40 covering the heating element 18. The cup-like member 45 is equipped with a further opening 48 through which extends, as best seen in Fig. 3, the end 49 of the thermostat element 47. The end 49 fits between a pair of upwardly extending lugs 51 carried by the plate 44, it being the function of these lugs to hold one end of the thermostat element 37 against movement so that the other end thereof, designated by reference numeral 52 in Fig. 3, may rotate a stud 54.

Stud 54, as best seen in Fig. 7, is part of an upper valve member 55 having a plate portion 56 and passages 57. Value member 55 rotates within the bore 58 of a valve support 59 with its plate portion 56 resting against the flange 60 of the valve support. The flange 60 has a pair of cam lugs 61 that coact with opposed cam surfaces 62 of the valve 55. It will be appreciated that normally the plate portion 56 of the valve 55 prevents the flow of water between it and flange 60 of valve support 59. However, upon exposure of the thermostat element 47 to water flowing into the cup-like member 45, the thermostat element 47 will react, and will rotate the valve 55. Thereupon, the cam lugs 61 will lift valve body 55 relatively to its support 59, opening a space between plate portion 56 and flange 60 for the flow of water. The valve support 59 is itself threaded at 63a and is thereby readily secured through a nut 64 to the plate 44.

The coffee container 65 is provided with a generally planar radially directed flange 66, best illustrated in Fig. 3. Flange 66 is formed with bayonet slots 67 so that by proper rotation of the container 60, it may be assembled to studs 68 extending from the sheet metal housing 12 and forming an integral part thereof. It is therefore possible readily to assemble the coffee container 65 to the housing 12 or to remove it from the housing 12 for cleansing. Preferably, a screen 69 is placed over the ground coffee so as to protect the valves and thermostat elements from any possible movement of coffee particles into the control mechanism.

While the operation of my invention is undoubtedly now clear to those skilled in the art, it may be well to outline one complete coffee making cycle. First, it is necessary to place ground coffee within the container 60 and to assemble the container 60 to the coffee making assembly, this being accomplished through the bayonet connection 62, 63. Water is placed in the upper water container 10, and then the handle member 14 is assembled to the handle member 17 of the coffee dispenser through a suitable operation of the finger piece 24 and the cover and detent member 22. The coffee making housing 12 is nested also within the coffee dispenser 13, and the electrical contacts are made through prongs 15 and sockets 16.

Heating element 18 generates heat immediately below the thermostat 37, and this thermostat acts to align passages 33, 31 for the flow of water. The water flows downwardly with the speed of flow depending upon the depth of water within the container. Immediately upon the water contacting and therefore cooling the thermostat element 37, the valve plate 32 is rotated again partially or fully to prevent the flow of any additional water. In the meantime, a certain amount of water has been applied to the metal plate 40 defining the upper surface of the heating element 18, and this water has been heated and allowed to flow downwardly to the plate 44. The water will flow from plate 44 through the openings 45 to the thermostat element 47. If this water has been heated to the proper temperature, element 47 will actuate the valve 55 to allow further flow of hot water to the ground coffee. While water is flowing into contact with the thermostat element 47, there has in the meantime been admitted a further additional increment of water into the heating chamber for actuation by the heating element 18. There is, therefore, as will now appear rather clearly, a continuous movement of small increments of water from the upper water container to the heating element 18. These small increments of water are heated rapidly by the heating element 18 for movement downward quickly to the ground coffee upon actuation by the lower thermostat element 47 of its valve 55. The heating of the water increments is extremely rapid, and the flow of each heated increment to the ground coffee is extremely rapid so that actually, I complete the making of a relatively large amount of coffee in a very short time.

When the coffee has been made, the handle 14 and its coffee making assembly are removed from assembled relation to the coffee dispenser by operation first of the finger piece 24. The coffee is now available for drinking.

I now claim:

1. In a coffee maker of the class described, an upper water container, a heating chamber below said water container having a heating element therein, a coffee holder below said heating chamber, a thermostat exposed to the heat of said heating chamber, a flow valve for said water container controlled by said thermostat whereby when said heating element is actuated, said valve is opened by said thermostat to allow flow of water into said heating chamber, a second flow valve between said coffee holder and heating chamber, and a second thermostat exposed to the water heated in said heating chamber for opening said second flow valve when said water is heated to a predetermined temperature.

2. In a coffee maker of the class described, an upper water container, a heating chamber below said water container having a heating element therein, a coffee holder below said heating chamber, a thermostat exposed to the heat of said heating chamber, a flow valve for said water container controlled by said thermostat whereby when said heating element is actuated, said valve is opened by said thermostat to allow flow of water into said heating chamber, there being passages opened by said valve for the flow of the water into contact with said thermostat to cool said thermostat and thereby urge said valve back toward closed position, a second flow valve between said coffee holder and heating chamber, and a second thermostat exposed to the water heated in said heating chamber for opening said second flow valve when said water is heated to a predetermined temperature.

3. In a coffee maker of the class described, an upper water container, a heating chamber below said water container having a heating element therein, a coffee holder below said heating chamber, a thermostat exposed to the heat of said heating chamber, a flow valve for said water container controlled by said thermostat whereby when said heating element is actuated, said valve is opened by said thermostat to allow flow of water into said heating chamber, insulation means between said heating chamber and said upper water container whereby said water is not heated until admitted into said heating chamber, a second flow valve between said coffee holder and heating chamber, and a second thermostat exposed to the water heated in said heating chamber for opening said second flow valve when said water is heated to a predetermined temperature.

4. In a coffee maker of the class described, an upper water container, a heating chamber below said water container having a heating element therein, a coffee holder below said heating chamber, a thermostat carried on the bottom of said upper water container and exposed to the heat of said heating chamber, a flow valve in the bottom of said water container above said thermostat controlled by said thermostat and opening passages for water flow whereby when said heating element is energized and actuates said thermostat, said water flowing through said passages and over said thermostat cools said thermostat while in contact therewith, a second flow valve between said coffee holder and heating chamber, and a second thermostat exposed to the water heated in said heating chamber for opening said second flow valve when said water is heated to a predetermined temperature.

5. In a coffee maker of the class described, an upper water container, a heating chamber below said water container having a heating element therein, a coffee holder below said heating chamber, a thermostat carried on the bottom of said upper water container and exposed to the heat of said heating chamber, a flow valve in the bottom of said water container above said thermostat controlled by said thermostat and opening passages for water flow whereby when said heating element is energized and actuates said thermostat, said water flowing through said passages and over said thermostat cools said thermostat while in contact therewith, a second flow valve between said coffee holder and heating chamber, a second thermostat superimposed with relation to said second valve exposed to the water heated in said heating chamber for opening said second flow valve when said water is heated to a predetermined temperature, and means for guiding the water flowing over said heating element into contact with said second thermostat.

6. In a coffee maker of the class described, an upper water container, a heating chamber below said water container having a heating element therein, a coffee holder below said heating chamber, a thermostat exposed to the heat of said heating chamber, a flow valve for said water container controlled by said thermostat whereby when said heating element is actuated, said valve is opened by said thermostat to allow flow of water into said heating chamber, a second flow valve between said coffee holder and heating chamber, a second thermostat superimposed with relation to said second valve exposed to the water heated in said heating chamber for opening said second flow valve when said water is heated to a predetermined temperature, and means for guiding the water flowing over said heating element into contact with said second thermostat.

7. In a coffee maker of the class described, an upper water container, a heating chamber below said water container having a heating element therein, a coffee holder below said heating chamber, a thermostat exposed to the heat of said heating chamber, a flow valve for said water container controlled by said thermostat whereby when said heating element is actuated, said valve is opened by said thermostat to allow flow of water into said heating chamber, there being passages opened by said valve for the flow of the water into contact with said thermostat to cool said thermostat and thereby urge said valve back toward closed position, a second flow valve between said coffee holder and heating chamber, a second thermostat superimposed relatively to said second flow valve, insulation for said second thermostat insulating it from said heating element, guide means for directing water heated by said heating element into contact with said second thermostat, and means whereby said second thermostat opens said second flow valve when said water is heated to a predetermined temperature.

8. In a coffee maker of the class described, an upper water container, a heating chamber below said water container having a heating element therein, a coffee holder below said heating chamber, a coiled thermostat, means securing said thermostat to the bottom of said water container exposed to the heat of said heating chamber, a flow valve for said water container rotatably mounted on the bottom of said water container and rotated by said thermostat whereby when said heating element is actuated, said valve is opened by said thermostat to allow flow of water into said heating chamber, a second flow valve between said coffee holder and heating chamber, a second coiled thermostat, means mounting said second thermostat in position to receive water heated by said heating element, and said second thermostat opening said second flow valve when said water is heated to a predetermined temperature to allow it to flow into said coffee container.

9. In a coffee maker of the class described, an upper assembly including a water container, a heating chamber below said water container having a heating element therein, a thermostat exposed to the heat of said heating chamber, a flow valve for said water container controlled by said thermostat whereby when said heating element is actuated, said valve is opened by said thermostat to allow flow of water into said heating chamber, a second flow valve below said heating chamber, a second thermostat exposed to the water heated in said heating chamber for opening said second flow valve when said water is heated to a predetermined temperature, a coffee container to receive water from said second flow valve, and a bayonet joint connection between said coffee container and said upper assembly.

References Cited in the file of this patent

UNITED STATES PATENTS

| | | |
|---|---|---|
| 748,910 | Acker | Jan. 5, 1904 |
| 1,916,369 | Harpster | July 4, 1933 |
| 1,920,013 | Green | July 25, 1933 |
| 2,005,764 | Wilcox | June 25, 1935 |
| 2,081,537 | Hanks | May 25, 1937 |
| 2,143,046 | Wilcox | Jan. 10, 1939 |
| 2,230,304 | Locke | Feb. 4, 1941 |
| 2,245,238 | Watson | June 10, 1941 |
| 2,285,114 | Ferris | June 2, 1942 |
| 2,292,853 | Wilcox | Aug. 11, 1942 |
| 2,317,453 | Graham | Apr. 27, 1943 |
| 2,422,974 | Newell | June 24, 1947 |